(12) United States Patent
Hwang et al.

(10) Patent No.: US 11,522,591 B2
(45) Date of Patent: Dec. 6, 2022

(54) BEAMFORMING DEVICE, BEAMFORMING SYSTEM AND BEAM FORMER

(71) Applicant: DELTA ELECTRONICS, INC., Taoyuan (TW)

(72) Inventors: Chieh-Tsao Hwang, Taoyuan (TW); Yen-Ting Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/158,019

(22) Filed: Jan. 26, 2021

(65) Prior Publication Data

US 2022/0014243 A1   Jan. 13, 2022

(30) Foreign Application Priority Data

Jul. 9, 2020 (CN) .......................... 202010655947.1

(51) Int. Cl.
*H04B 7/06* (2006.01)
(52) U.S. Cl.
CPC ................. *H04B 7/0617* (2013.01)
(58) Field of Classification Search
CPC .................................................. H04B 7/0617
USPC ......................................................... 375/267
See application file for complete search history.

(56) References Cited

U.S. PATENT DOCUMENTS

| | | | |
|---|---|---|---|
| 5,257,031 A * | 10/1993 | Scarpetta | H01Q 3/26 342/374 |
| 5,467,100 A | 11/1995 | Chen | |
| 10,784,566 B1 * | 9/2020 | Chang | H01Q 25/005 |
| 2010/0099370 A1 | 4/2010 | Nichols et al. | |
| 2014/0269389 A1 * | 9/2014 | Bukkfejes | G01S 3/48 370/252 |
| 2019/0238172 A1 | 8/2019 | Hoogzaad et al. | |
| 2019/0319663 A1 | 10/2019 | Shimura | |

FOREIGN PATENT DOCUMENTS

| | | |
|---|---|---|
| CN | 108736160 A | 11/2018 |
| EP | 0735608 A1 | 10/1996 |
| EP | 3113283 A1 | 1/2017 |
| JP | H8-97620 A | 4/1996 |
| JP | H8-274529 A | 10/1996 |
| TW | 200532988 A | 10/2005 |
| WO | 2018/074378 A1 | 4/2018 |
| WO | 2020/018593 A1 | 1/2020 |

OTHER PUBLICATIONS

Cidronali A et al: "Analysis and Performance of a Smart Antenna for 2.45-GHz Single-Anchor Indoor Positioning" IEEE Transactions on Microwave Theory and Techniques, Plenum, USA, vol. 58, No. 1, Jan. 1, 2010 (Jan. 1, 2010), pp. 21-31, XP011297539,ISSN: 0018-9480.

* cited by examiner

*Primary Examiner* — Lihong Yu
(74) *Attorney, Agent, or Firm* — CKC & Partners Co., LLC

(57) ABSTRACT

The present disclosure relates to a beamforming device, including a transceiver circuit, a switch circuit and a beam former. The switch circuit is electrically connected to the transceiver circuit. The beam former contains a plurality of antenna units. The antenna units receive and send signals according to multiple radiation angles, and the radiation angle of each antenna unit is different. The switch circuit selectively conducts one of the antenna units to the transceiver circuit according to a control signal.

11 Claims, 4 Drawing Sheets

BEAMFORMING DEVICE, BEAMFORMING SYSTEM AND BEAM FORMER

CROSS-REFERENCE TO RELATED APPLICATION

This application claims priority to China Application Serial Number 202010655947.1, filed Jul. 9, 2020, which is herein incorporated by reference in its entirety.

BACKGROUND

Technical Field

The present disclosure relates to a beamforming system, especially a technology that receives and transmits wireless signals through multiple antenna units.

Description of Related Art

Beamforming is a technology that receives and transmits wireless signals directionally through an antenna array. The antenna array can superimpose transmission signals or receiving signals in a specific direction for a precise directional transmission. There are many circuit structures that performs beamforming, but different circuit structures not only affect the power added efficiency (PAE), but are also closely related to the production cost.

SUMMARY

One aspect of the present disclosure is a beamforming device, comprising a transceiver circuit, a switch circuit and a beam former. The switch circuit is electrically connected to the transceiver circuit. The beam former comprises a plurality of antenna units. The plurality of antenna units receive and transmit signals according to a plurality of radiation angles, the plurality of radiation angles respectively corresponding to the plurality of antenna units are different from each other, and the switch circuit selectively conducts one of the plurality of antenna units to the transceiver circuit according to a control signal.

Another aspect of the present disclosure is a beam former, comprising a plurality of antenna units. The plurality of antenna units are electrically connected to a switch circuit. The plurality of antenna units receive and transmit signals according to a plurality of radiation angles. The plurality of radiation angles respectively corresponding to the plurality of antenna units are different from each other, the switch circuit selectively conducts one of the plurality of antenna units to a transceiver circuit, and the beam former generates a radiation direction according to the conducted one of the plurality of antenna units.

Another aspect of the present disclosure is a beamforming system, comprising a phase adjustment circuit and a plurality of beamforming devices. The phase adjustment circuit comprises a plurality of phase gain adjusters, and configured to adjust a first phase of a wireless signal in a first direction. Each of the plurality of beamforming devices comprises a transceiver circuit, a switch circuit and a beam former. The transceiver circuit is electrically connected to one of the plurality of phase gain adjusters. The switch circuit is electrically connected to the transceiver circuit. The beam former comprises a plurality of antenna units. The plurality of antenna units receive and transmit signals according to a plurality of radiation angles, the plurality of radiation angles respectively corresponding to the plurality of antenna units are different from each other, and the switch circuit selectively conducts one of the plurality of antenna units to the transceiver circuit according to a control signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
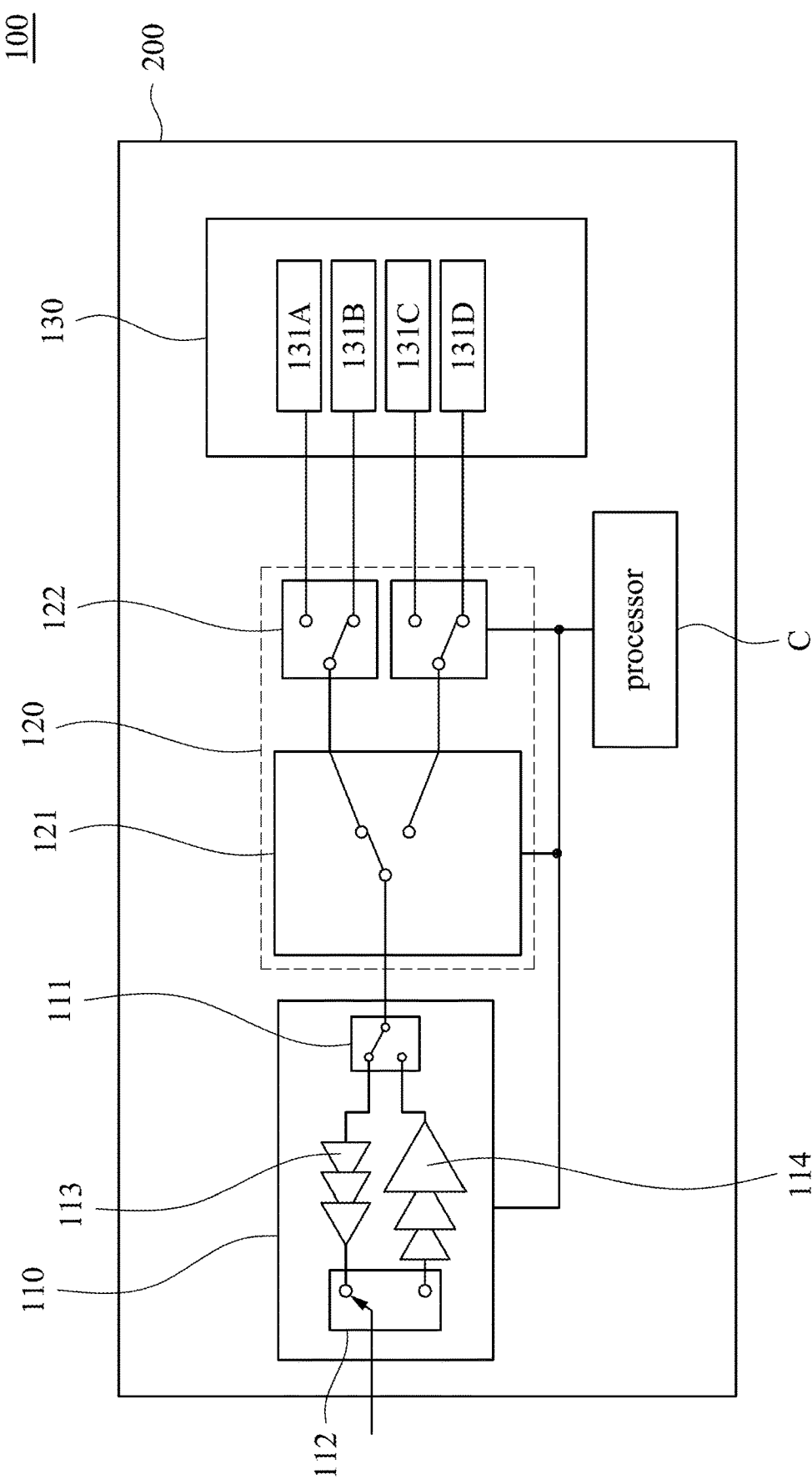
FIG. 1 is a schematic diagram of a beamforming system in some embodiments of the present disclosure.

Referring to FIG. 1, FIG. 1 is a schematic diagram of a beamforming system 100 in some embodiments of the present disclosure. The beamforming system 100 includes a transceiver circuit 110, a switch circuit 120 and a beam former 130. The transceiver circuit 110 is configured to receive a wireless signal, or is configured to transmit the wireless signal out. The transceiver circuit 110 is electrically connected to a processor C of the beamforming system 100. The processor C is configured to perform various operations, and may be implemented by a microcontroller, microprocessor, a digital signal processor, an application specific integrated circuit (ASIC) or a logic circuit.

The switch circuit 120 is electrically connected to the transceiver circuit 110. In some embodiments, the switch circuit 120 includes a first switch unit 121 and multiple second switch unit 122. The first switch unit 121 includes a one-to-two switch, the second switch unit 122 includes two one-to-two switches. The switch circuit 120 may have a one-to-four selective switching function through the first switch unit 121 and the second switch unit 122. The circuit structure of the switch circuit 120 is not limited to the circuit shown in FIG. 1, and a one-to-eight the switch unit or other the switch circuit can also be used (as shown in FIG. 1, the switch circuit 120 has eight selectively conductive terminals.)

Figure 2:
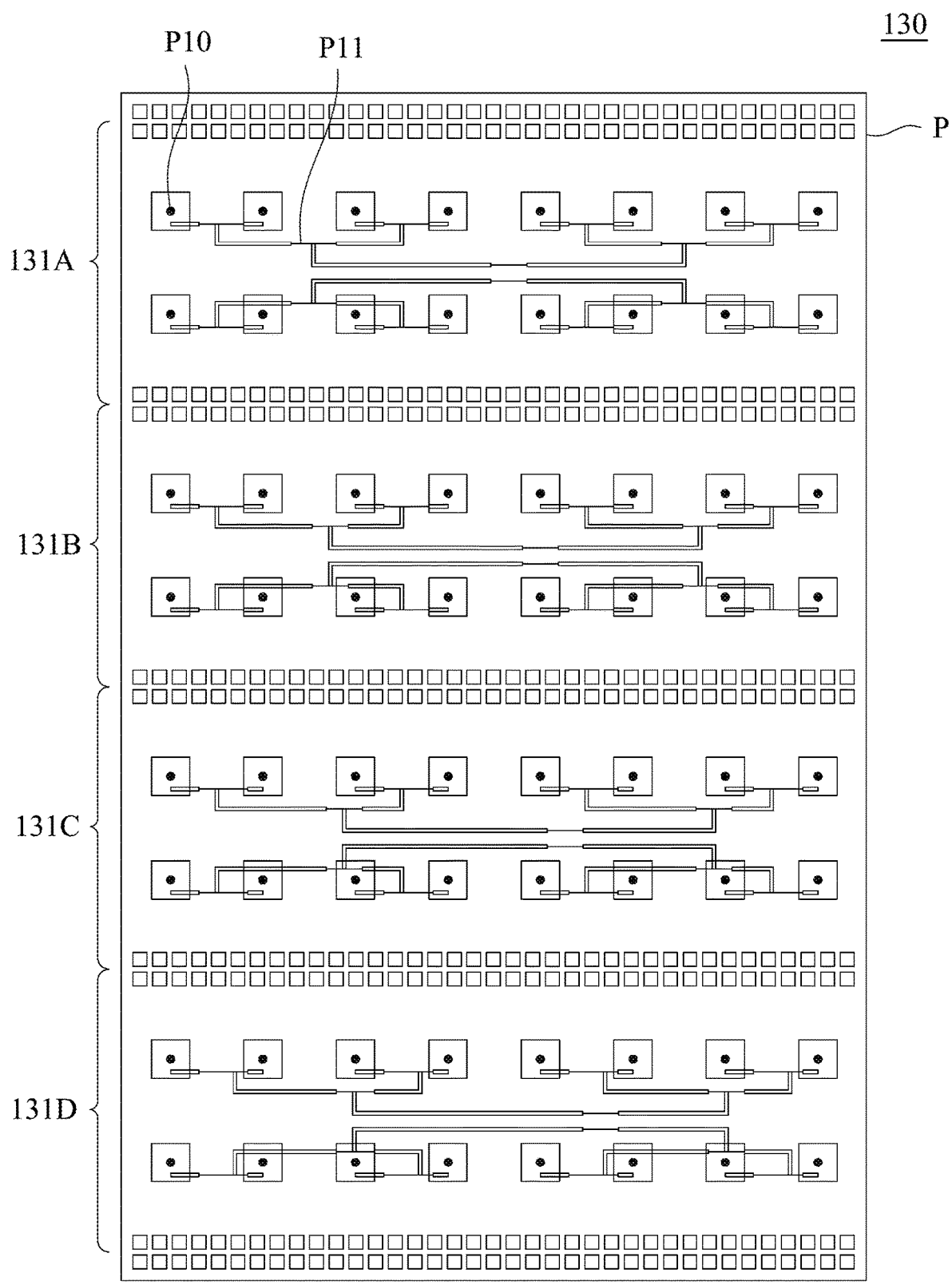
FIG. 2 is a schematic diagram of a beam former in some embodiments of the present disclosure.

Referring to FIG. 1 and FIG. 2, FIG. 2 is a schematic diagram of a beam former 130 in some embodiments of the present disclosure. The beam former 130 includes multiple antenna units 131A-131D. The antenna units 131A-131D receive signals according to the multiple radiation angle, the radiation angles corresponding to the antenna units 131A-131D are different. The antenna units 131A-131D are electrically connected to four terminals of the switch circuit 120, the switch circuit 120 selectively conducts one of the antenna units 131A-131D to the transceiver circuit 110 according to a control signal transmitted by the processor C.

When the switch circuit 120 conducts the antenna units 131A-131D to the transceiver circuit 110, the transceiver circuit 110 receives or transmits the wireless signal by the beam former 130. The switch circuit 120 selectively conducts one of the antenna units (e.g., antenna unit 131), so as to adjust the radiation direction of the entire beam former 130. For example, the radiation angle of the antenna unit 131A corresponds to 5 degrees in the horizontal direction, the radiation angle of the antenna unit 131B corresponds to 16 degrees in the horizontal direction, the radiation angle of the antenna unit 131C corresponds to 27 degrees in the horizontal direction, and the radiation angle of the antenna unit 131D corresponds to 39 degrees in the horizontal direction, but the present disclosure is not limited to this.

For example, when the switch circuit 120 conducts the transceiver circuit 110 to the antenna unit 131A according to the received control signal, the radiation direction of the entire beam former 130 may be the radiation angle (5 degrees) of the antenna units 131A. Similarly, when the switch circuit 120 conducts the transceiver circuit 110 to the antenna unit 131B according to the received control signal, the radiation direction of the entire beam former 130 may be the radiation angle (16 degrees) of the antenna units 131B.

Specifically, the manufacturing process of the transceiver circuit 110 will have a significant impact on the cost and PAE of the beamforming system 100. For example, if the transceiver circuit 110 is made by the manufacturing process for SiGe (i.e., the internal transistor is made of SiGe), the production cost is lower, but PAE is not ideal. On the other hand, if the transceiver circuit 110 is made by the manufacturing process for GaN (i.e., the internal transistor is made of GaN), PAE will be significantly increased, but the cost is extremely high.

In one embodiment, the transceiver circuit 110 is made by the manufacturing process for GaN to maintain PAE. As shown in FIG. 1, since the beamforming system 100 is connected and selectively conducts one of the antenna units 131A-131D by the switch circuit 120, the transceiver circuit 110 may only need to configure one channel to generate a high antenna gain.

As shown in FIG. 1, the transceiver circuit 110, the switch circuit 120 and the beam former 130 can be used as a passive beamforming device 200. "Passive" means that the transceiver circuit 110 does not require an adjustment circuit to adjust the phase or the strength of the signal. The passive beamforming device 200 conducts the different antenna units 131A-131D in different states by the switch circuit 120, so as to change the radiation direction of the entire beam former 130. Accordingly, the accuracy of signal transmission, PAE and production cost will be ensured together.

In one embodiment, the antenna units 131A-131D may be implemented by a patch antenna. The antenna units 131A-131D each have a wire length, an area (or wire width) or a distribution position different from each other, so that each of the antenna units 131A-131D has a fixed and the different radiation angle and different radiation field pattern. In some embodiments, the beam former 130 includes a circuit board P. The antenna units 131A-131D are arranged on the circuit board P. As shown in FIG. 2, the circuit board P includes multiple feed points P10. The feed points P10 are connected to each other through wires P11, so that the feed points P10 and wires P11 are used to form the antenna units 131A-131D. The antenna units 131A-131D each have a wire length, an area or a distribution position different from each other, so that each of the antenna units 131A-131D has the different radiation angle (radiation field pattern.)

In one embodiment, the transceiver circuit 110 is electrically connected to the switch circuit 120 and the processor C, and includes a first switching circuit 111, a second switching circuit 112, a receiving circuit 113 and a transmission circuit 114. The receiving circuit 113 and the transmission circuit 114 are electrically connected between the first switching circuit 111 and the second switching circuit 112. One terminal of the first switching circuit 111 is electrically connected to the switch circuit 120, so as to selectively conduct the switch circuit 120 to the receiving circuit 113 or the transmission circuit 114. One terminal of the second switching circuit 112 is electrically connected to a device. The first switching circuit 111 and the second switching circuit 112 are controlled by the processor C, so as to selectively conducts the processor C to the switch circuit 120. In other words, the transceiver circuit 110 may selectively transmit the received wireless signal to the device by the first switching circuit 111 and the second switching circuit 112, or selectively transmit the wireless signal, which is generated by the device, to the switch circuit 120.

In one embodiment, after actual testing, the beamforming system 100 with a passive beamforming device 200 has a power consumption of 2.4 watts. The power consumption of other types of beamforming devices has a power consumption of 10-15 watts. The Effective Isotropic Radiated Power (EIRP) of the beamforming system 100 reaches 41 dBm, which meets the standard. In addition, as mentioned above, since the transceiver circuit 110 can be configured with only one channel, the cost of the manufacturing process for GaN can be saved.

Figure 3:
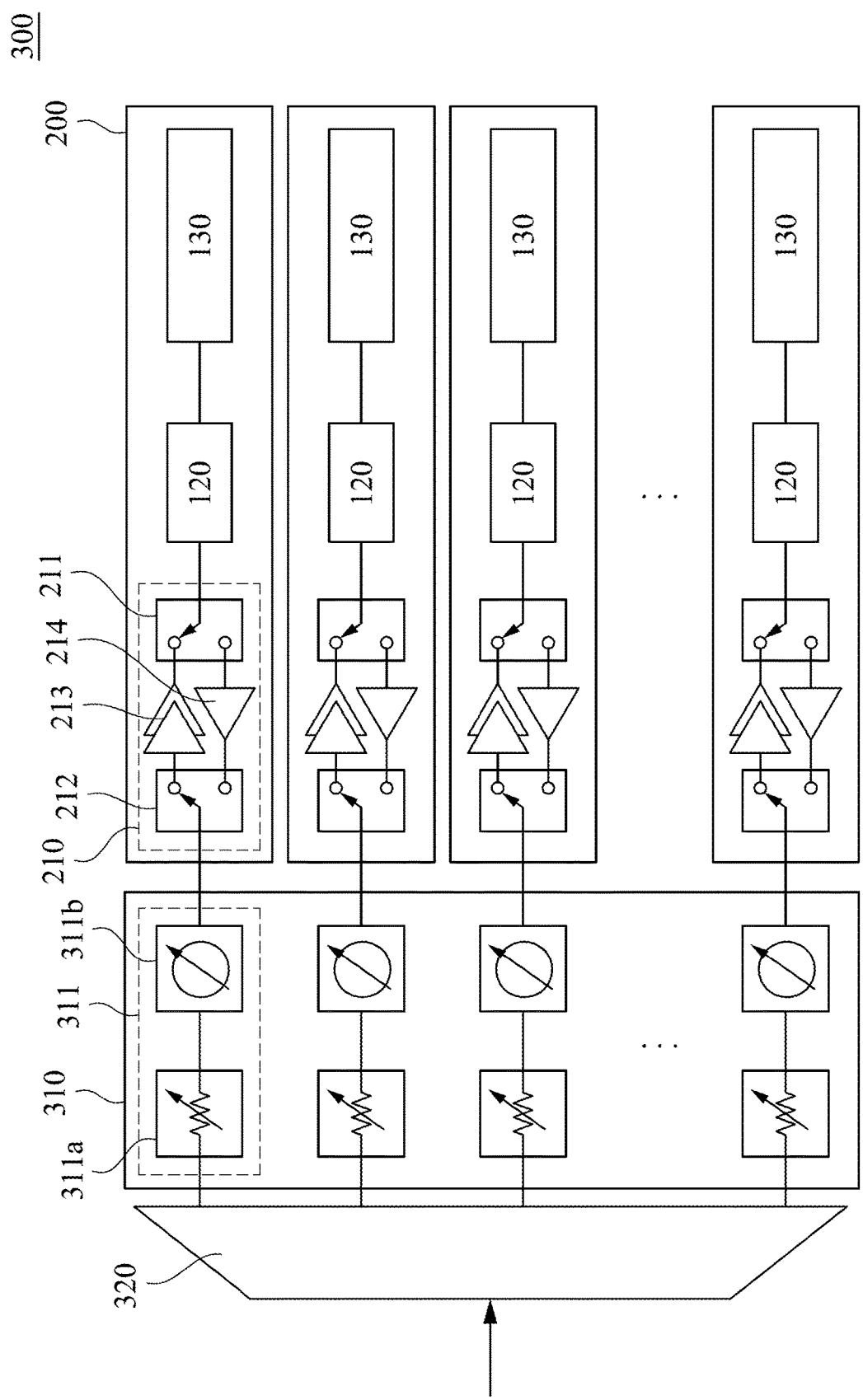
FIG. 3 is a schematic diagram of a beamforming system in some embodiments of the present disclosure.

FIG. 3 is a schematic diagram of a beamforming system 300 in some embodiments of the present disclosure. In FIG. 3, the similar components associated with the embodiment of FIG. 1 are labeled with the same numerals for ease of understanding. The specific principle of the similar component has been explained in detail in the previous paragraphs, and unless it has a cooperative relationship with the components of FIG. 3, it is not repeated here.

In this embodiment, the beamforming system 300 may be a Hybrid structure, including the phase adjustment circuit 310 and multiple beamforming devices 200. Alternatively stated, the phase adjustment circuit 310 may actively adjust the phase and strength of the wireless signal, and the beamforming device 200 passively switches the radiation direction through the switch circuit 120. As shown in FIG. 3, the phase adjustment circuit 310 is electrically connected to the processor and the beamforming devices 200, and includes multiple phase gain adjusters 311. The phase gain adjuster 311 is configured to adjust the first phase of the wireless signal in the first direction according to the adjustment command from the drive circuit 320. In some embodiments, the phase adjustment circuit 310 is configured to adjust the signal phase in the vertical direction. In addition, in some embodiments, the phase adjustment circuit 310 is made by the manufacturing process for SiGe, that is, the phase adjustment circuit 310 includes a silicon germanium material transistor. One of ordinary skill in the art is aware of various circuit structures and principles of the phase adjustment circuit 310, and thus a description in this regard is not further provided herein. The beamforming device 200 can be the "passive" beamforming device described in the previous embodiment. The beamforming device 200 includes the transceiver circuit 210, the switch circuit 120 and the beam former 130. One of ordinary skill in the art is aware of various circuit structures and principles of the switch circuit 120 and the beam former 130, and thus a description in this regard is not further provided herein.

Specifically, the phase gain adjuster 311 includes a gain adjustment circuit 311a and a phase adjustment circuit 311b, so that when the phase gain adjuster 311 receives the adjustment command from the drive circuit 320, the phase gain adjuster 311 adjusts the gain of the wireless signal first, and then adjusts the phase of the wireless signal. One of ordinary skill in the art is aware of various circuit structures and principles of the phase gain adjuster 311, and thus a description in this regard is not further provided herein.

Each transceiver circuit 210 of the beamforming devices 200 is respectively electrically connected to one of the phase gain adjusters 311. The beam former 130 of the beamforming device 200 has different radiation field patterns in the second direction. Therefore, the switch circuit 120 may selectively conduct one of the antenna units in the beam former 130, so as to decide the radiation direction of the beam former 130 in the second direction. In other words, the beamforming device 200 adjusts the radiation direction the beam former 130 in the horizontal direction by the switch circuit 120.

As shown in FIG. 3, the phase adjustment circuit 310 can actively adjust the radiation angle of the wireless signal in the first direction through the phase gain adjuster 311. The beamforming device 200 passively adjusts the radiation angle of the wireless signal in the second direction through the switch circuit 120. Accordingly, through the combination of the active and passive, the manufacturing process for SiGe and the manufacturing process for GaN, it may be balance costs and improve power conversion efficiency. In addition, since the beamforming system 300 includes multiple beamforming devices 200, the beamforming system 300 can have a longer transmission distance with the same power consumption.

As shown in FIG. 3, in one embodiment, the transceiver circuit 210 includes a first switching circuit 211, a second switching circuit 212, a transmission circuit 213 and a receiving circuit 214. One terminal of the first switching circuit 211 is electrically connected to the switch circuit 120. The transmission circuit 213 and the receiving circuit 214 are electrically connected to the other terminal of the first switching circuit 211. The two terminals of the second switching circuit 212 are electrically connected to one of the phase gain adjusters 311, the receiving circuit 214 and the transmission circuit 213. The first switching circuit 211 selectively conducts the switch circuit 120 to the receiving circuit 214 or the transmission circuit 213. The second switching circuit 212 selectively conducts the corresponding phase gain adjusters 311 to the receiving circuit 214 or the transmission circuit 213.

Figure 4:
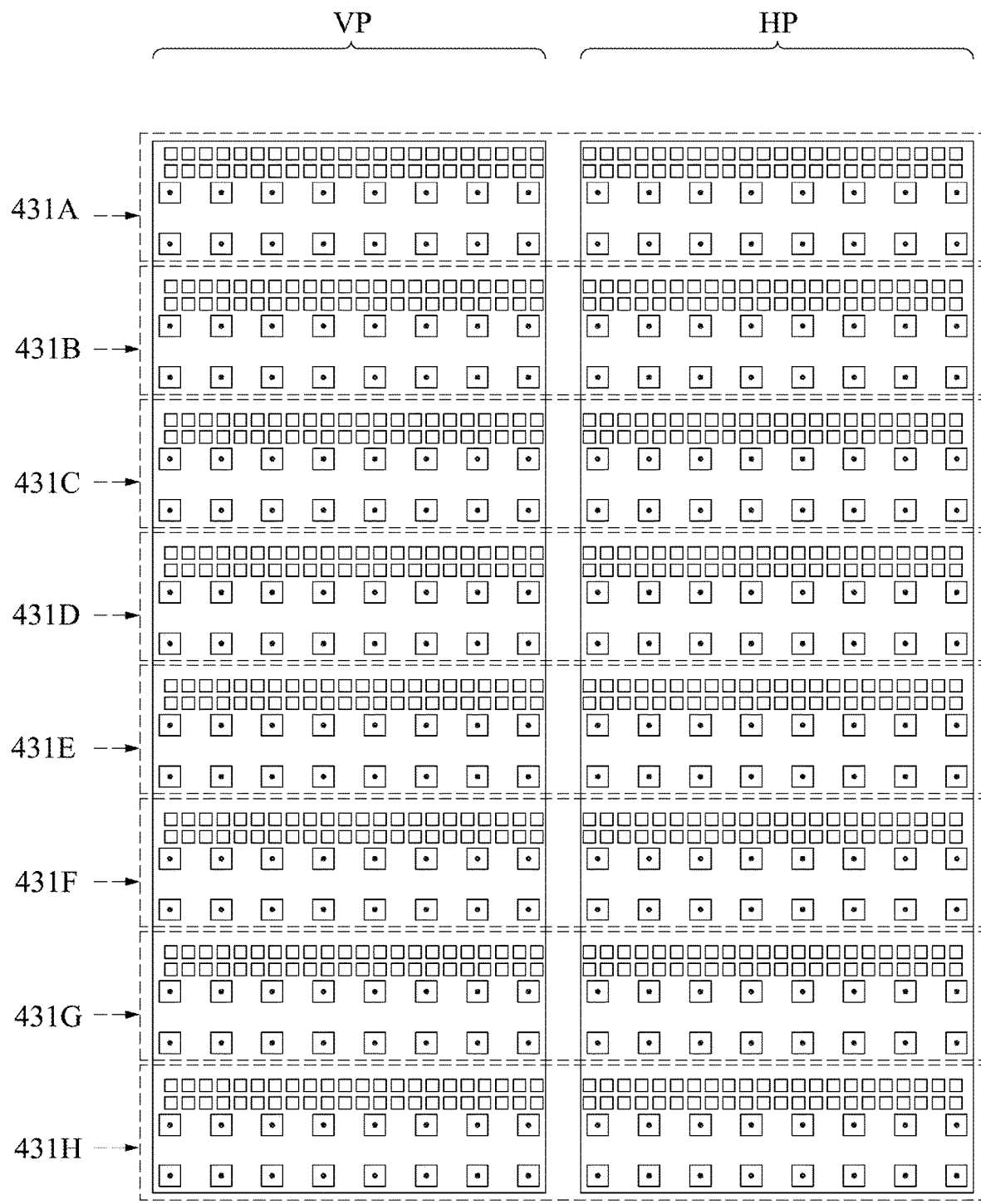
FIG. 4 is a schematic diagram of a beam former in some embodiments of the present disclosure.

Referring to FIG. 4, FIG. 4 is a schematic diagram of a beam former 430 in some embodiments of the present disclosure. In order to avoid the figure being complicated and difficult to identify, feed points and wires are not drawn in FIG. 4. In this embodiment, the beam former 430 includes eight antenna units 431A-431H. The antenna units 431A-431H further include vertical polarization adjustment sections VP and horizontal polarization adjustment sections HP. That is, the vertical polarization adjustment sections VP of the antenna units 431A-431H is configured to transmit and receive vertical polarization signals, respectively. The horizontal polarization adjustment sections HP of the antenna units 431A-431H are configured to transmit and receive horizontal and vertical polarization signals, respectively. In this embodiment, the vertical polarization adjustment sections VP and the horizontal polarization adjustment sections HP of the antenna units 431A-431H correspond to the radiation angles of "39, 27, 16, 5, −5, −16, −27 And −39 degrees", and has the function of a dual-polarized antenna.

In one embodiment, the beamforming system 300 of the Hybrid structure includes four channels. Alternatively stated, including four beam formers 130. After actual testing, the EIRP of the beamforming system 300 is increased to about 53 dBm, and the power consumption is 12 W. If other types of beamforming systems have the same EIRP, their power consumption will be as high as about 40-60 watts.

In some other embodiments, the beamforming system 300 of the Hybrid structure includes eight channels. Alternatively stated, including eight beam formers 130. After actual testing, the EIRP of the beamforming system 300 is increased to about 59 dBm, and the power consumption is 24 W. If other types of beamforming system have the same EIRP, their power consumption will be as high as about 75-100 watts, which is much higher than this disclosure.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. A beamforming device, comprising:
  a transceiver circuit;
  a switch circuit electrically connected to the transceiver circuit; and
  a beam former comprising a plurality of antenna units, wherein the plurality of antenna units receive and transmit signals according to a plurality of radiation angles, the plurality of radiation angles respectively corresponding to the plurality of antenna units are different from each other, and the switch circuit selectively conducts one of the plurality of antenna units to the transceiver circuit according to a control signal;
  wherein the plurality of antenna units each have a wire length different from each other, so that the plurality of radiation angles respectively corresponding to the plurality of antenna units are different from each other.
2. The beamforming device of claim 1, wherein the transceiver circuit is configured to receive a wireless signal, or transmit the wireless signal out through the beam former; the beamforming device selectively conducts one of the plurality of antenna units by the switch circuit to adjust a radiation direction of the beam former.

3. The beamforming device of claim 1, wherein the transceiver circuit is electrically connected to the switch circuit and a processor.

4. The beamforming device of claim 3, wherein the transceiver circuit further comprises:
 a switching circuit;
 a receiving circuit; and
 a transmission circuit, wherein the switching circuit selectively conducts the switch circuit to the receiving circuit or the transmission circuit.

5. The beamforming device of claim 1, wherein the beam former further comprises:
 a circuit board comprising a plurality of feed points, wherein the plurality of feed points are connected through a plurality of wires, and the plurality of feed points and the plurality of wires are configured to form the plurality of antenna units.

6. A beam former, comprising:
 a plurality of antenna units electrically connected to a switch circuit, wherein the plurality of antenna units receive and transmit signals according to a plurality of radiation angles, the plurality of radiation angles respectively corresponding to the plurality of antenna units are different from each other, the switch circuit selectively conducts one of the plurality of antenna units to a transceiver circuit, and the beam former generates a radiation direction according to the conducted one of the plurality of antenna units;
 wherein the plurality of antenna units each have a wire length different from each other, so that the plurality of radiation angles respectively corresponding to the plurality of antenna units are different from each other.

7. The beam former of claim 6, further comprising:
 a circuit board comprising a plurality of feed points, wherein the plurality of feed points are connected through a plurality of wires, and the plurality of feed points and the plurality of wires are configured to form the plurality of antenna units.

8. A beamforming system, comprising:
 a phase adjustment circuit comprising a plurality of phase gain adjusters, and configured to adjust a first phase of a wireless signal in a first direction; and
 a plurality of beamforming devices, wherein each of the plurality of beamforming devices comprises:
  a transceiver circuit electrically connected to one of the plurality of phase gain adjusters;
  a switch circuit electrically connected to the transceiver circuit; and
  a beam former comprising a plurality of antenna units, wherein the plurality of antenna units receive and transmit signals according to a plurality of radiation angles, the plurality of radiation angles respectively corresponding to the plurality of antenna units are different from each other, and the switch circuit selectively conducts one of the plurality of antenna units to the transceiver circuit according to a control signal;
 wherein the plurality of antenna units each have a wire length different from each other, so that the plurality of radiation angles respectively corresponding to the plurality of antenna units are different from each other;
 wherein the beamforming system selectively conducts one of the plurality of antenna units by the switch circuit to adjust the wireless signal in a second direction.

9. The beamforming system of claim 8, wherein the plurality of antenna units each have a wire length, an area or a distribution position different from each other.

10. The beamforming system of claim 9, wherein the beam former comprises:
 a circuit board comprising a plurality of feed points, wherein the plurality of feed points are connected through a plurality of wires, and the plurality of feed points and the plurality of wires are configured to form the plurality of antenna units.

11. The beamforming system of claim 8, wherein the transceiver circuit further comprises:
 a first switching circuit electrically connected to the switch circuit;
 a receiving circuit electrically connected to the first switching circuit;
 a transmission circuit electrically connected to the first switching circuit; and
 a second switching circuit electrically connected to one of the plurality of phase gain adjusters, the receiving circuit and the transmission circuit, wherein the first switching circuit selectively conducts the switch circuit to the receiving circuit or the transmission circuit, and the second switching circuit selectively conducts the one of the plurality of phase gain adjusters to the receiving circuit or the transmission circuit.

\* \* \* \* \*